United States Patent [19]
Fuenzalida

[11] Patent Number: 5,129,159
[45] Date of Patent: Jul. 14, 1992

[54] CAKE DIVIDER WITH ORNAMENT SUPPORT

[76] Inventor: Eduardo C. Fuenzalida, 27634 Del Norte Ct., Hayward, Calif. 94545

[21] Appl. No.: 519,408

[22] Filed: May 4, 1990

[51] Int. Cl.$^5$ ............................ A21C 5/08; B26B 3/04
[52] U.S. Cl. ............................................ 30/114; 30/303
[58] Field of Search ............... 30/114, 115, 278, 279, 30/279.2, 302, 303; D7/142

[56] References Cited

U.S. PATENT DOCUMENTS

| | | | |
|---|---|---|---|
| 1,104,718 | 7/1914 | Trevisan | 30/114 |
| 1,520,436 | 12/1924 | Peyton | 30/303 |
| 1,613,223 | 1/1927 | Davis | 30/114 |
| 1,706,934 | 3/1929 | Miles et al. | 30/114 |
| 2,003,253 | 5/1935 | Deutsch | 30/114 |
| 2,605,547 | 8/1952 | Tweeten | 30/114 |
| 4,250,618 | 2/1981 | Custer et al. | 30/114 |

FOREIGN PATENT DOCUMENTS

| | | | |
|---|---|---|---|
| 464973 | 4/1914 | France | 30/303 |
| 583757 | 12/1946 | United Kingdom | 30/303 |

Primary Examiner—Douglas D. Watts
Assistant Examiner—Paul M. Heyrana
Attorney, Agent, or Firm—Linval B. Castle

[57] ABSTRACT

A cake divider having a plurality of blades evenly spaced around a central member in a radial pattern for cutting equal sized wedges of cake. The central member may be cylindrical with a cap that may replaced with a large diameter plate to serve as a platform for a candle tray, muxic box, etc.

14 Claims, 2 Drawing Sheets

CAKE DIVIDER WITH ORNAMENT SUPPORT

BRIEF SUMMARY OF THE INVENTION

This invention relates to bakery utensils and particularly to a cutting tool having a central post to which are attached the edges of a plurality of radial blades, equally spaced for cutting equal size wedges of a circular pastry, such as a cake.

Pastry dividers exist for marking the top crusts of pies into various numbers of equal size wedges. These dividers do not cut through the crust but merely mark the crust surface for guiding a knife cut. The cake divider to be described employs thin blades that are intended to actually cut through a cake to form approximately twenty-four equal size wedges.

Two embodiments of the cake divider of the invention are described herein. One embodiment comprises a plurality of vertical thin blades radially attached to a small diameter central vertical rod which may have a top ornament or candle holder. In the second embodiment, the blades are attached to a central vertical cylindrical blade having a removable top cap with a flat surface so that the surface may be used as a table for added ornaments, such as a music box, candle tray, or the like. If desired, the removable cap may be replaced with a large diameter plate which may support a second cake or a larger ornamental display.

BRIEF DESCRIPTION OF THE DRAWINGS

In the drawings which illustrate preferred embodiments of the invention.

DETAILED DESCRIPTION OF THE PREFERRED EMBODIMENT

FIGS. 1 through 4 are views illustrating a cake divider for accurately cutting a circular pastry or cake into a certain number of equal size wedges. In the illustrated divider, a total of twenty-four equal size pastry wedges are produced by twenty-four rectangular blades 10, each approximately two to four inches in height by four to six inches in length. The blades may be molded plastic sharpened on their bottom edges but are preferably thin stainless steel with the shorter edge of the rectangle attached to a central shaft 12 that is flush with the bottom edges of the blades and extends about three inches above the top edges. The top end of the shaft 12 is preferably threaded to receive the female threads in a convenient knob 14. The diameter of the shaft 12 should be as small as possible and still support the twenty-four blades 10 and it has been found that the smallest practical diameter of the shaft for supporting thin stainless steel blades is about 5/16 inches.

In use as a divider, the blades 10 are forced through a pastry or cake on a flat plate to divide the it into twenty four equal pieces. If desired, the knob 14 on the central shaft 12 may be unscrewed and replaced with an ornament such as a candle holder or the like and the ornamented divider may remain in the pastry while the pastry or cake is being served.

Figure 1:
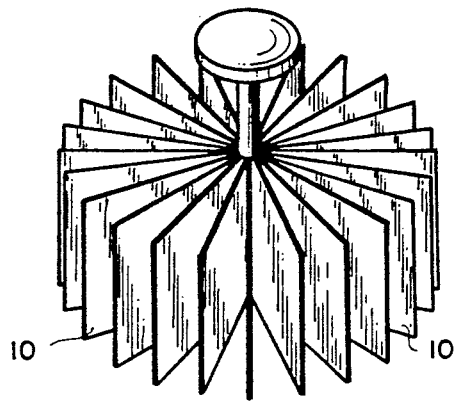
FIG. 1 is a perspective view illustrating one form of my cake divider.
Figure 2:
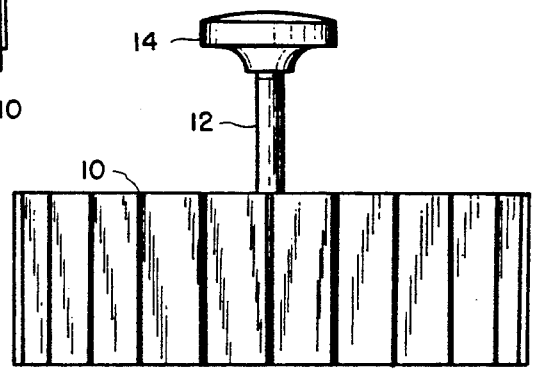
FIG. 2 is a side elevational view thereof.
Figure 3:
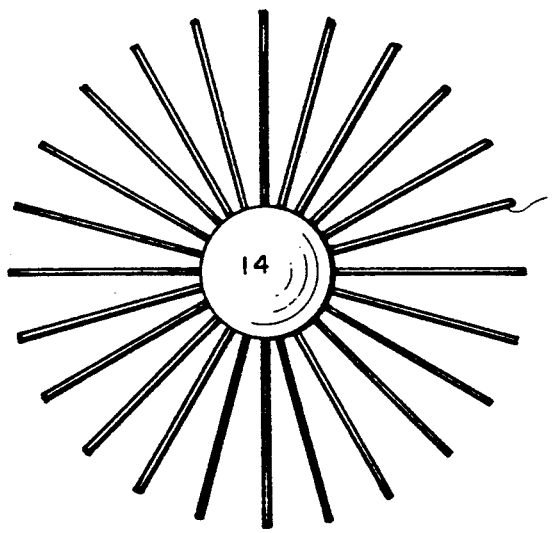
FIG. 3 is a top plan view thereof.
Figure 4:
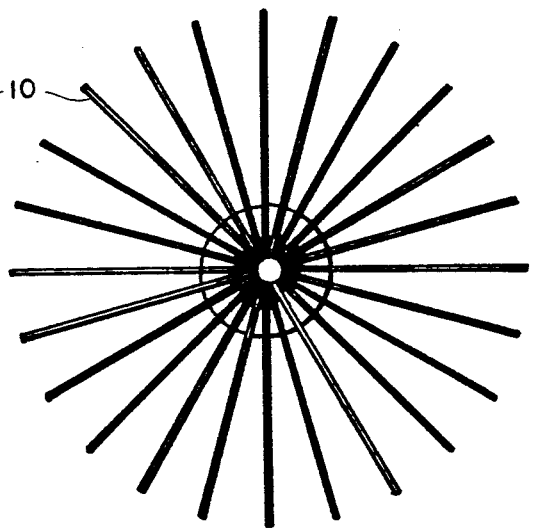
FIG. 4 is a bottom plan view thereof.
Figure 5:
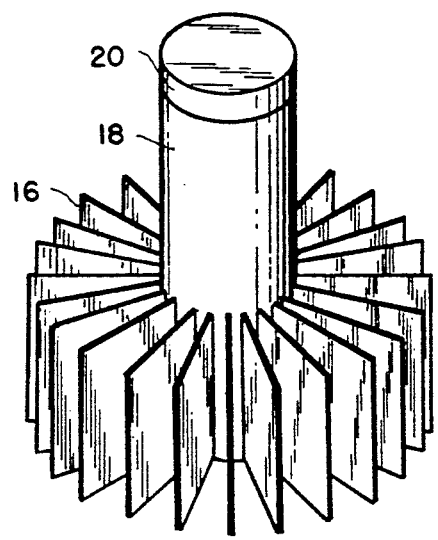
FIG. 5 is a perspective view of an alternate embodiment of cake divider using a cylindrical central blade with removable cap.

FIG. 5 is a perspective view illustrating a second embodiment of a cake divider having the same number of radial blades 16 and same outside diameter as the divider of FIG. 1, but with the blades attached to the outer surface of a central cylinder 18 having a diameter of about two to three inches and a total height of five to six inches including a removable flat-topped cylinder cap 20.

Figure 6:
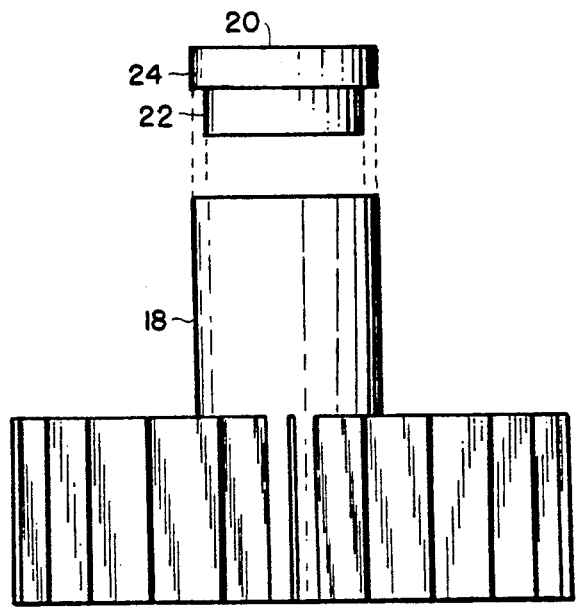
FIG. 6 is a side elevational view illustrating the connection between the cylindrical central blade and the cap.

As shown in the elevational view of FIG. 6, the cap 20 has a section 22 that fits into the bore of the cylinder 18 and a top section 24 having the same peripheral diameter as that of the cylinder. If desired, caps having greater peripheral diameters may be used to provide large plate-like surfaces for placement of ornaments, gifts, or accessories such as a candle tray or music box.

Figure 7:
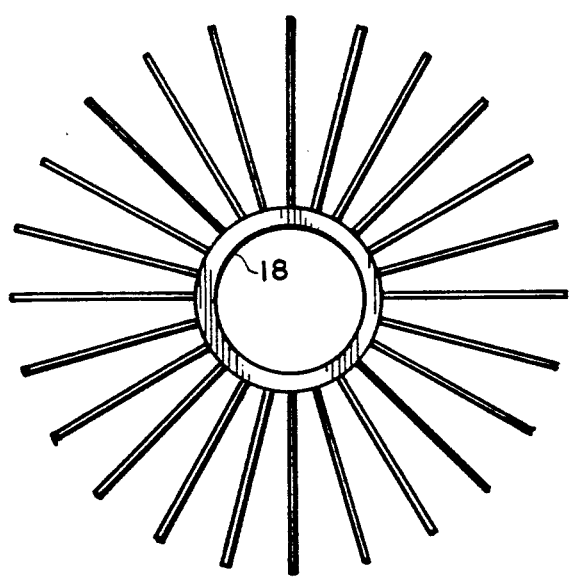
FIG. 7 is a plan view of the divider without the attached cap.
Figure 8:
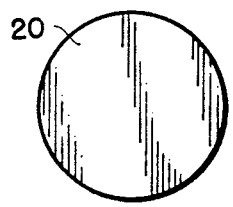
FIG. 8 is a top plan view of the cap.
Figure 9:
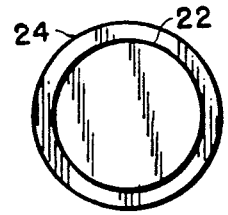
FIG. 9 is a bottom plan view of the cap.

FIG. 7 is a plan view of the cake divider of FIG. 5 showing that the central cylinder 18 is tubular and open at both ends for ease in cleaning cake residue from the interior of the cylinder FIGS. 8 and 9 are top and bottom plan views of the cylinder cap 20.

I claim:

1. A divider for cutting a fixed number of equal sized wedge shaped servings of a circular cake, said divider comprising:

an elongated vertical member having a top end and a bottom end;

a plurality of substantially identical rectangular blades each blade of said plurality having a cutting edge and an adjacent attachment edge, the attachment edges of said plurality of blades being permanently attached in an equally spaced radial pattern around the surface of said vertical member with the cutting edges substantially flush with the bottom end of said vertical member; and a removable and replaceable top member attached to the top end of said vertical member.

2. The divider claimed in claim 1 wherein said elongated vertical member is a rod having a threaded top end for receiving said replaceable top member.

3. The divider claimed in claim 1 wherein said elongated vertical member is a cylindrical tube and said removable and replaceable top member is a cap having a flat surface for supporting ornaments.

4. The divider claimed in claim 1 wherein said blades and said vertical member are formed of molded plastic.

* * * * *